(12) United States Patent
Hsiao (10) Patent No.: US 10,947,356 B2
(45) Date of Patent: Mar. 16, 2021

(54) POROUS NANOCOMPOSITE AND RELATED METHOD

(71) Applicant: THE UNIVERSITY OF SOUTH ALABAMA, Mobile, AL (US)

(72) Inventor: Kuang-Ting Hsiao, Spanish Fort, AL (US)

(73) Assignee: THE UNIVERSITY OF SOUTH ALABAMA, Mobile, AL (US)

(*) Notice: Subject to any disclaimer, the term of this patent is extended or adjusted under 35 U.S.C. 154(b) by 0 days.

(21) Appl. No.: 15/505,775

(22) PCT Filed: Aug. 31, 2015

(86) PCT No.: PCT/US2015/047753
§ 371 (c)(1),
(2) Date: Feb. 22, 2017

(87) PCT Pub. No.: WO2016/036663
PCT Pub. Date: Mar. 10, 2016

(65) Prior Publication Data
US 2017/0240715 A1 Aug. 24, 2017

Related U.S. Application Data

(60) Provisional application No. 62/123,354, filed on Nov. 14, 2014, provisional application No. 62/070,664, filed on Sep. 2, 2014.

(51) Int. Cl.
*B82Y 30/00* (2011.01)
*B32B 5/02* (2006.01)
(Continued)

(52) U.S. Cl.
CPC .............. *C08J 9/0076* (2013.01); *B32B 5/02* (2013.01); *B32B 5/10* (2013.01); *B82Y 30/00* (2013.01);
(Continued)

(58) Field of Classification Search
CPC .... B32B 5/02; B32B 5/10; B32B 5/12; B32B 5/22; B32B 5/26; B32B 5/28;
(Continued)

(56) References Cited

U.S. PATENT DOCUMENTS 5,490,602 A * 2/1996 Wilson .................... B29C 70/22
216/56
2002/0034624 A1 * 3/2002 Harpell .................... D04H 3/12
428/198
(Continued)

FOREIGN PATENT DOCUMENTS

WO WO-2014065719 A1 * 5/2014 ............... B64C 3/20

OTHER PUBLICATIONS

International Preliminary Report on Patentability for PCT/US2015/047753.
International Search Report for PCT/US2015/04775.

*Primary Examiner* — Maria V Ewald
*Assistant Examiner* — Ethan A. Utt
(74) *Attorney, Agent, or Firm* — J.M. Robertson, LLC (57) ABSTRACT

A nanocomposite including an array of extended length fibers with nanofibers oriented in transverse relation to the extended length fibers. The nanofibers are mechanically interlocked with the extended length fibers using a connecting agent concentrated at contact locations between the extended length fibers and the nanofibers without saturating the composite. The resultant composite of fibers and connecting agent is characterized by significant internal porosity with an internal void volume not occupied by the connecting agent.

21 Claims, 3 Drawing Sheets

(51) Int. Cl.
*B32B 5/10* (2006.01)
*C08K 7/06* (2006.01)
*C08J 9/00* (2006.01)
*C08K 3/04* (2006.01)
*C08J 9/28* (2006.01)
*C08J 9/36* (2006.01)
*D01F 9/12* (2006.01)

(52) U.S. Cl.
CPC ............... *C08J 9/286* (2013.01); *C08J 9/365* (2013.01); *C08K 3/046* (2017.05); *C08K 7/06* (2013.01); *C08J 2201/022* (2013.01); *C08J 2201/0504* (2013.01); *C08J 2363/00* (2013.01); *C08K 2201/003* (2013.01); *C08K 2201/004* (2013.01); *C08K 2201/011* (2013.01); *D01F 9/12* (2013.01)

(58) Field of Classification Search
CPC . B32B 27/04; B32B 2260/00; B32B 2260/02; B32B 2260/021; B32B 2260/023; B32B 2260/04; B32B 2260/044; B32B 2260/046; B32B 2260/048; B32B 5/00; B32B 5/022; B32B 5/026; B32B 5/06; B32B 5/24; B32B 7/00; B32B 7/04; B32B 7/05; B32B 7/08; B32B 7/09; B82B 1/00; B82B 3/00; B82Y 30/00; B82Y 40/00; Y10T 442/3179; Y10T 442/3195; Y10T 428/2913; Y10T 428/2915; Y10T 428/2918; Y10T 428/2933; Y10T 428/2938; Y10T 428/294; Y10T 428/2962; Y10T 428/2964; Y10T 428/2965; Y10T 428/2967; Y10T 428/2969; Y10T 428/2971; Y10T 428/298; Y10T 442/60; Y10T 442/608; Y10T 442/614; Y10T 442/627; Y10T 428/24058; Y10T 428/24074; Y10T 428/24083; Y10T 428/24091; Y10T 428/24099; Y10T 428/24116; Y10T 428/24124; Y10T 428/24132; Y10T 428/24802; Y10T 428/2481; Y10T 428/24818; Y10T 428/24826; Y10T 428/249962; Y10T 428/249964; Y10T 428/249975; Y10T 428/249982; Y10T 428/249985; Y10T 428/249986; Y10T 428/29; Y10T 428/2922; Y10T 428/2924; Y10T 428/2925; Y10T 442/30; Y10T 442/3049; Y10T 442/3057; Y10T 442/3065; Y10T 442/3203; Y10T 442/3211; Y10T 442/3301; Y10T 442/3309; Y10T 442/3317; D03D 11/00; D03D 25/00; D03D 25/005; D03D 2700/01; D03D 2700/0011; D04H 3/115; D04H 3/12; D04H 3/00; D04H 3/08; D04H 3/10; D04H 3/14; D04H 13/00
USPC ................ 442/203, 181, 187–189, 205–207, 442/218–220, 327, 334, 340, 352; 977/762, 766, 767, 768, 770; 139/408–410; 428/365, 367, 373, 374, 428/375, 377, 378, 392, 401, 364, 379, 428/391, 393, 105, 107–114, 195.1, 428/196–198, 311.11, 311.51, 314.2, 428/317.1, 317.7, 317.9, 357, 369–371, 428/394–396
See application file for complete search history.

(56) References Cited

U.S. PATENT DOCUMENTS

| | | | |
|---|---|---|---|
| 2010/0021682 A1* | 1/2010 | Liang | D04H 1/4218 428/103 |
| 2012/0123053 A1* | 5/2012 | Kibayashi | B29B 15/08 428/367 |
| 2012/0292439 A1* | 11/2012 | Hallander | B64D 45/02 244/1 A |
| 2013/0005208 A1* | 1/2013 | Retz | B32B 5/22 442/205 |
| 2013/0291979 A1* | 11/2013 | Nordin | H05H 1/2406 137/803 |

* cited by examiner

POROUS NANOCOMPOSITE AND RELATED METHOD

CROSS-REFERENCE TO RELATED APPLICATIONS

This non-provisional application is a National Phase of International Application Number PCT/US2015/047753, filed Aug. 31, 2015 and claims the benefit of, and priority from, U.S. provisional applications 62/070,664 filed Sep. 2, 2014 and 62/123,354 filed Nov. 14, 2014. The contents of such prior applications and all documents referenced herein are hereby incorporated by reference in their entirety as if fully set forth herein.

TECHNICAL FIELD

This disclosure relates generally to a nanocomposite and methods for the manufacture and use thereof. More specifically, the present disclosure relates to a nanocomposite including an arrangement of extended length fibers (usually microfibers) with nanofibers oriented in transverse stitched relation to the extended length fibers. The nanofibers are mechanically interlocked with the extended length fibers using a minimal amount of connecting agent to secure the extended length fibers and the nanofibers at the contact locations without saturating the composite. The resultant composite of fibers and connecting agent is characterized by significant internal porosity wherein a significant percentage of the interior space excluding the fiber constituents is not occupied by the binding matrix.

BACKGROUND

Composite materials (also called "composition materials" or shortened to "composites") are materials made from two or more constituent materials with significantly different physical or chemical properties that, when combined, produce a material with characteristics different from the individual components. The individual components remain separate and distinct within the finished structure. The new material may be preferred for many reasons: common examples include materials which are stronger, lighter or less expensive when compared to traditional materials.

Composite materials may find application in numerous environments of use. By way of example only, and not limitation, typical environments of use may include buildings, bridges, structures such as boat hulls, swimming pool panels, car bodies, shower stalls, bathtubs, storage tanks, imitation granite and cultured marble sinks and counter tops. The most advanced examples of composite materials may be used on spacecraft and in other highly demanding environments.

Several types of nanomaterials have been used to create advanced composite structures. Industries desiring high performance, light weight structures have increasingly focused on fiber reinforced plastics (FRPs). In FRPs, the fiber reinforcement is typically a system containing a plurality of micro-scale fibers, which have fiber diameter ranges from 1 micrometer to 1000 micrometers. FRP materials are generally considered superior to their metallic counterparts due to their high strength-to-weight ratios. However, improvements in the durability and damage tolerance of these light-weight materials are still desired because of the relative weakness of the binding polymer matrix in FRP laminates. In this regard, the weakness of most FRP laminates is caused by the lack of effective fiber reinforcement in the direction perpendicular to the local micro-scale fiber orientation. For example, in a typical FRP laminate with micro-scale fibers orientated in the in-plane direction, the weak direction is the through-thickness direction. As a result, many through-thickness-direction related properties of FRP laminates are dominated by the properties of the polymer matrix, rather than by the fibers.

So called "nanocomposites" incorporating nanoscale materials are well known. In this regard, it will be understood that a nanocomposite is a multiphase solid material where one of the phases has one, two or three dimensions in "nanoscale," or structures having "nanoscale" repeat distances between the different phases that make up the material. Materials incorporating nanoscale structures may have unique properties stemming from morphological features with nanoscale dimensions. In this regard, the term "nanoscale" is often defined as smaller than 1 nanometer in at least one dimension. However, in practice and in existing commercial products, some nanostructures may have their smallest dimensions significantly larger than 1 nanometer. On the other hand, recent nanotechnology development has also made some structures with dimensions substantially less than 1 nanometer. Hence, for purposes of this disclosure, it is to be understood that "nanoscale" is defined as from 0.1 nanometer to 1000 nanometers. A "nanoscale material" is a natural, incidental or manufactured material containing nanoscale structures "nanostructrures" such as fibers, particles and the like, in an unbound state or as an aggregate or agglomerate. In this regard, a "nanocomposite" is usually taken to mean the solid combination of a bulk matrix of connecting agent and nano-dimensional phase(s) differing in properties due to dissimilarities in structure and chemistry. The mechanical, electrical, thermal, optical, electrochemical, catalytic properties of the nanocomposite will differ markedly from that of the component materials.

An important aspect of nanotechnology is the vastly increased ratio of surface area to volume present in many nanoscale materials, which makes possible new quantum mechanical effects. One example is the "quantum size effect" where the properties of solids having particles dispersed within a matrix may be altered as a result of significant reductions in particle size. By way of example only, characteristics such as electrical conductivity and optical fluorescence may be influenced significantly by the presence of nanostructures due to the dramatically increased surface area to volume ratio of those structures. These significant influences typically do not come into play by going from macro to micro dimensions. However, they become pronounced when the nanoscale size range is reached.

A certain number of physical properties also alter with the change to nanoscale systems. By way of example only, nanostructures within a bulk material can strongly influence mechanical properties of the material, such as stiffness or elasticity. In some applications of use, it has been found that traditional polymers can be reinforced by nanostructures resulting in novel materials which can be used as lightweight replacements for metals. Such nanotechnologically enhanced materials may enable a weight reduction accompanied by an increase in stability and improved functionality. Other functions such as catalytic activity for treatment of biomaterials also may be strongly influenced by the presence of nanoscale structures.

Several studies have demonstrated that the appropriate addition of nanostructures such as nanofibers, to a polymer matrix can drastically enhance the polymer matrix performance. When introducing nanostructures to improve performance in a FRP material, there are two primary processes which have been used to improve a multi-scale composite laminate: (1) targeted reinforcement of the fiber/matrix interface; and (2) the general reinforcement of the bulk matrix. Reinforcement of the interface may be achieved by the deposition of nanostructures on the surface of the continuous fiber systems. Exemplary deposition processes include electrophoresis, chemical vapor deposition, and sizing. Bulk matrix reinforcement is typically done by adding nanostructures into the matrix solution before impregnation of the micro-scale fiber system thereby forming a so called "nanocomposite 10".

Despite the advancements made in prior nanocomposites, the technology remains at a very early stage where systematic improvement has yet to be achieved. In particular there is a need to optimize the performance of the connecting agent which may be a performance-limiting component in the final composite.

In this disclosure the following definitions apply:

A "nanostructure" is a structure that has at least one of its dimensions within the nanoscale range (i.e., from 0.1 nanometer to 1000 nanometers);

A "high-aspect-ratio nanostructure" is a nanostructure wherein at least one of its dimensions is at least five times larger than its smallest dimension;

A "nanofiber" is a, extended length-shaped, high-aspect-ratio nanostructure with an effective diameter being within the nanoscale range (i.e., from 0.1 nanometer to 1000 nanometers) and a length being at least 10 micrometers. For purposes of this disclosure, a "nanofiber" may include individual fibers as well as collections of fibers or other structures bundled together or otherwise interconnected to form a fiber-shaped structure having an effective final diameter within the nanoscale range. Thus, by way of example only, a "nanofiber" may be in the form of a so called "nano-rope" formed from a bundle of nanotubes or nano-dimension fibers wherein the resultant "nano-rope" has a final effective diameter within the above-referenced nanoscale range.

A "microfiber" is an extended length-shaped, high-aspect-ratio structure with its effective diameter being within the microscale range (i.e., from 1 micrometer to 1000 micrometers). For purposes of this disclosure, a "microfiber" may include individual fibers as well as collections of fibers or other structures bundled together or otherwise interconnected to form a fiber-shaped structure having an effective final diameter within the microscale range. Thus, by way of example only, a "microfiber" may be in the form of a rope-like structure formed from a bundle of nanotubes or nano-dimension fibers wherein the resultant rope-like structure has a final effective diameter within the above-referenced microscale range.

An "extended length fiber" is an extended length-shaped, high-aspect-ratio structure having a length dimension at least 100 times its diameter.

SUMMARY OF THE DISCLOSURE

The present disclosure provides advantages and alternatives over the prior art by providing a nanocomposite including an arrangement of extended length fibers with nanofibers oriented in transverse relation to the extended length fibers. The nanofibers are mechanically interlocked with the extended length fibers using connecting agent concentrated at contact locations between the extended length fibers and the nanofibers to form exemplary bonding connections without saturating the composite. The resultant composite of fibers and connecting agent is characterized by significant internal porosity with an internal void volume not occupied by the connecting agent.

In accordance with one exemplary aspect, the present disclosure provides a nanocomposite including an array of extended length fibers having a cross-sectional diameter and a length dimension. The length dimension of the extended length fibers is at least 100 times greater than the cross sectional diameter. The extended length fibers are arranged with their length dimensions extending substantially parallel to a common reference plane. A plurality of nanofibers extends in stitched relation at least partially across the array of extended length fibers. The nanofibers are oriented in a direction substantially transverse to the reference plane. On average, the nanofibers contact and operatively connect three or more of the extended length fibers such that the nanofibers form a long-range nano-stitching pattern. A connecting agent is disposed at points of connection between the nanofibers and the extended length fibers such that the connecting agent mechanically interlocks the nanofibers to the extended length fibers at the points of connection. Zones remote from the points of connection are substantially devoid of the connecting agent such that the nanocomposite has a porous internal void volume and wherein a control volume of the nanocomposite satisfies the following formula:

$$\frac{V - V_f - V_{nf} - V_{ca}}{V - V_f - V_{nf}} \geq 20\%$$

wherein V equals total control volume; $V_f$ equals volume of extended length fibers within the control volume; $V_{nf}$ equals the volume of nanofibers within the control volume; and $V_{ca}$ equals volume of connecting agent within the control volume.

In accordance with one exemplary feature, the present disclosure is directed to a nanocomposite including an array of extended length fibers having a length of at least 100 times of the diameter of such extended length fibers. A plurality of nanofibers is disposed in a transverse direction through an array of the extended length fibers to define an extended nano-stitching pattern through the array of extended length fibers. A connecting agent adjoins the nanofibers to the extended length fibers at contact locations on the extended length fibers. The connecting agent may be substantially concentrated at the contact locations such that the nanocomposite is highly porous characterized by a substantial internal void volume free of connecting agent. That is, the connecting agent does not fill the interstices between the fiber constituents. The internal porosity is such that a representative control volume of the nanocomposite excluding the extended length fibers and the nanofibers is at least 20% not occupied by the connecting agent. On average, the nanofibers are adjoined to three or more transversely oriented extended length fibers to establish an extended length nano-stitching pattern. Such an extended length nano-stitching pattern facilitates load transfer between non-adjacent extended length fibers within the array of extended length fibers through the nanofiber connections.

In one exemplary feature, of the present disclosure, the internal void volume may be at least partially filled with an energy absorption material such as energy absorption gel, inorganic energy absorption material (such as ceramic); organic energy absorption material, or the like.

In another exemplary feature, a nanocomposite consistent with the present disclosure may be characterized by mechanical tensile strength in the direction parallel to the majority of the extended length fibers which is not less than 60% of the tensile strength of a corresponding benchmark composite consisting of an equivalent amount of extended length fiber fully saturated with the same connecting agent.

In yet another exemplary feature, a nanocomposite consistent with the present disclosure may further include at least one protective coating or film (e.g., polymer, rubber, ceramic, metal, etc.) disposed at a surface of the nanocomposite to protect against a harsh environment.

In yet another exemplary feature, a nanocomposite consistent with the present disclosure may further include at least one waterproof and breathable coating or film disposed at a surface of the nanocomposite 10 to protect against water damage.

In accordance with another exemplary feature, a nanocomposite consistent with the present disclosure may include a functional material. Such functional materials may exhibit useful property changes including, without limitation, electronic, magnetic, optical, mechanical, piezoelectric, ferroelectric, photovoltaic, chromogenic, shape memory, thermoelectric, self-healing, self-assembling, phase change, exothermic reaction, endothermic reaction, chemical properties, weld materials, adhesives, and biomedical. The functional materials used may have any number of forms including liquid phase, solid phase, gas phase, or consisting of a phase change material. By way of example only, exemplary functional materials may include sensor materials, actuator materials, absorption materials, damping materials, repair materials, self-healing materials, light-emitting materials, optical materials, conductors, semi-conductors, insulators, medicines, bio-medical materials, fire-retarding materials, fire extinguishing materials, reactive materials, catalyst materials, or mixtures thereof. Functional materials may be controlled by temperature, light, electrical field, magnetic field, pH, humidity, chemical content in contact therewith.

In accordance with another exemplary feature, a nanocomposite consistent with the present disclosure may provide desired functions unrelated to any functional materials. By way of example only, the nanocomposite may provide mechanical strength to bear load while the internal void volume provides at least a second function. Without being limited, such a second function may include damage sensing, self-healing, easy repair, fluid dynamics control/sensing, thermal control/sensing, control and sensing of chemicals in contact therewith, humidity control/sensing, de-icing, weld-joining, weld-dissembling, adhesive joining, magnetic joining, improved electrical properties, improved thermal properties, improved magnetic properties, improved optical properties, improved acoustic properties, improved thermal-mechanical properties, enhanced electrical connections between two connected pieces of the nanocomposite materials, improved biomedical performance of the nanocomposite, wave or signal absorption, wave or signal emission, impact energy absorption, vibration damping, shielding against lightning strike, EMI, RFI, radiation, or cosmic ray, or providing a thermal protection barrier.

In a further feature, a nanocomposite consistent with the present disclosure may also embody a variety of methods of use relating to the aforementioned internal void volume. By way of example only and not limitation, in accordance with one exemplary practice, the internal void volume may be coated or filled or partially filled with at least one functional material. In this regard, the functional material may promote the physical and chemical properties (e.g., electrical conductivity, electrical properties, thermal conductivity, shape memory behavior, piezoelectric behavior, fracture toughness, critical stress intensity factor, vibration damping, extreme temperature tolerance, chemical compatibility with other materials to connect later, etc.) of the nanocomposite. More than one functional material may be used if desired to provide different properties. By way of example only, functional materials may be used for purposes such as: to promote bone or tissue growth; to repel water while simultaneously allowing air to pass through; to repel a type of chemical fluid while simultaneously allowing other type of fluids to pass through; to promote or prevent bio-growth; to detect environment change; to react or interact with environment change; for joining or dissembling at least two pieces of the nanocomposite; for energy storage; for repairing the nanocomposite; for detecting the damage of the nanocomposite; to control electrical transmission; to act as a catalyst substrate; or to detect a predetermined chemical.

In a further feature, a nanocomposite consistent with the present disclosure may include an internal void volume used for acoustic absorption, signal absorption, or to control the direction of fluid into or out of the nanocomposite.

It is to be understood that other aspects, advantages, and features of the disclosure will become apparent through a reading of the following detailed description of the disclosure and/or through use of the described embodiments. Accordingly, such description is to be understood to be exemplary and explanatory only and in no event is the disclosure to be limited to any illustrated and described embodiments. On the contrary, it is intended that the present disclosure shall extend to all alternatives and modifications as may embrace the principals of this disclosure within the true spirit and scope thereof.

BRIEF DESCRIPTION OF THE DRAWINGS

Exemplary embodiments of the present disclosure will now be described by way of example only, with reference to the accompanying drawings which are incorporated in and which constitute a part of the specification herein, and together with the general description given above, and the detailed description set forth below, serve to explain the principles of the disclosure wherein.

Before the exemplary embodiments and procedures are explained in detail, it is to be understood that the disclosure is in no way limited in its application or construction to the details set forth in the following description or illustrated in the drawings. Rather, the disclosure is capable of other embodiments and of being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION

Reference will now be made to the drawings, wherein, to the extent possible, like reference numerals are used to designate like elements in the various views. As best seen through joint reference to FIGS. 1 and 2, a nanocomposite 10 consistent with the present disclosure includes an array of extended length fibers 12 oriented so as to be substantially parallel to a common reference plane (not shown). Accordingly, for example, in a three-dimensional axis system, the extended length fibers 12 may be oriented generally in the "X" direction and/or the "Y" direction so as to be substantially parallel to a common reference plane (not shown) which is perpendicular to the "Z" axis. In this regard, the extended length fibers 12 may be oriented either parallel or transverse to one another. By way of example only, and not limitation, such extended length fibers 12 may be microfibers as defined above having an effective diameter within the microscale range from 1 micrometer to 1000 micrometers. However, fibers with larger and smaller diameters may likewise be used if desired. A desired characteristic of the extended length fibers 12 is a high aspect ratio such that the fiber length is at least 100 times the fiber diameter. Of course, much longer fibers may also be used if desired. The extended length fibers 12 may be formed from any exemplary material. By way of example only, exemplary materials may include glass fibers, carbon fibers, polymer fibers, aramid fibers and the like. Microfibers formed from such materials will be well known to those of skill in the art and are commonly used as the reinforcements in fiber reinforced composites such as fiber reinforced polymer "FRP" composites and the like.

Figure 1:
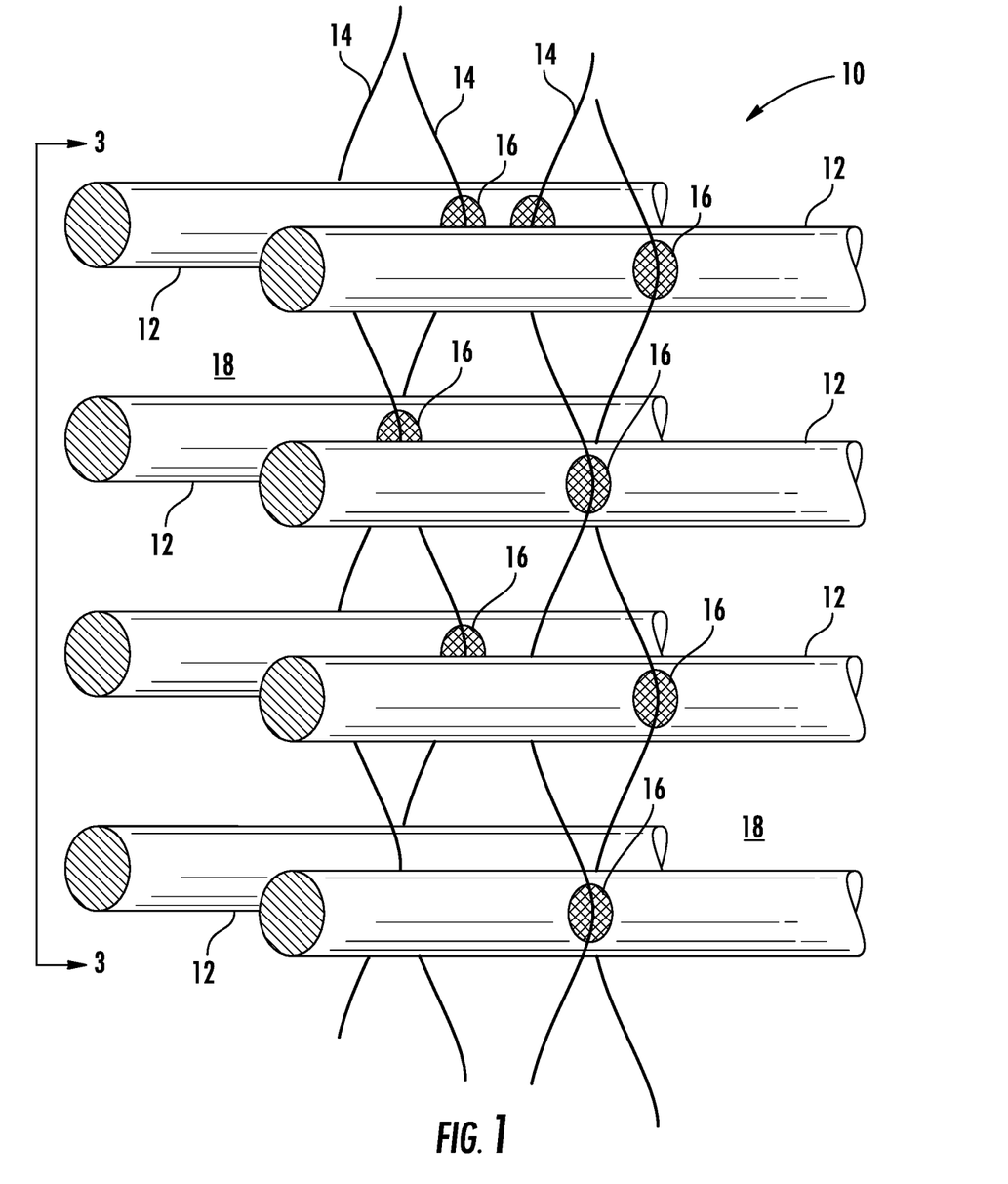
FIG. 1 is a schematic illustration of an exemplary nanocomposite structure consistent with the present disclosure wherein a plurality of nanofibers are disposed in inserted transverse relation to extended length fibers with connecting agent adjoining the nanofibers to the extended length fibers at points of contact.

In a nanocomposite 10 consistent with the present disclosure, the extended length fibers 12 may be grouped into fiber rows and then the rows may be further grouped into mats or fabrics. Thus, as best seen in FIG. 1, the array of extended length fibers 12 may include fibers with their length dimensions disposed in two or more parallel planes. Maintaining the length of the extended length fibers 12 is highly desirable since a short fiber may have the potential to slip and a fiber reinforced composite with shorter fibers is typically weaker than a fiber reinforced composite with shorter fibers. Thus, although shorter fibers may be used, for purposes of the present disclosure, the use of longer fibers may be desirable. In this regard, extended length fibers having a length of at least 100 times the diameter may be particularly advantageous.

Figure 2:
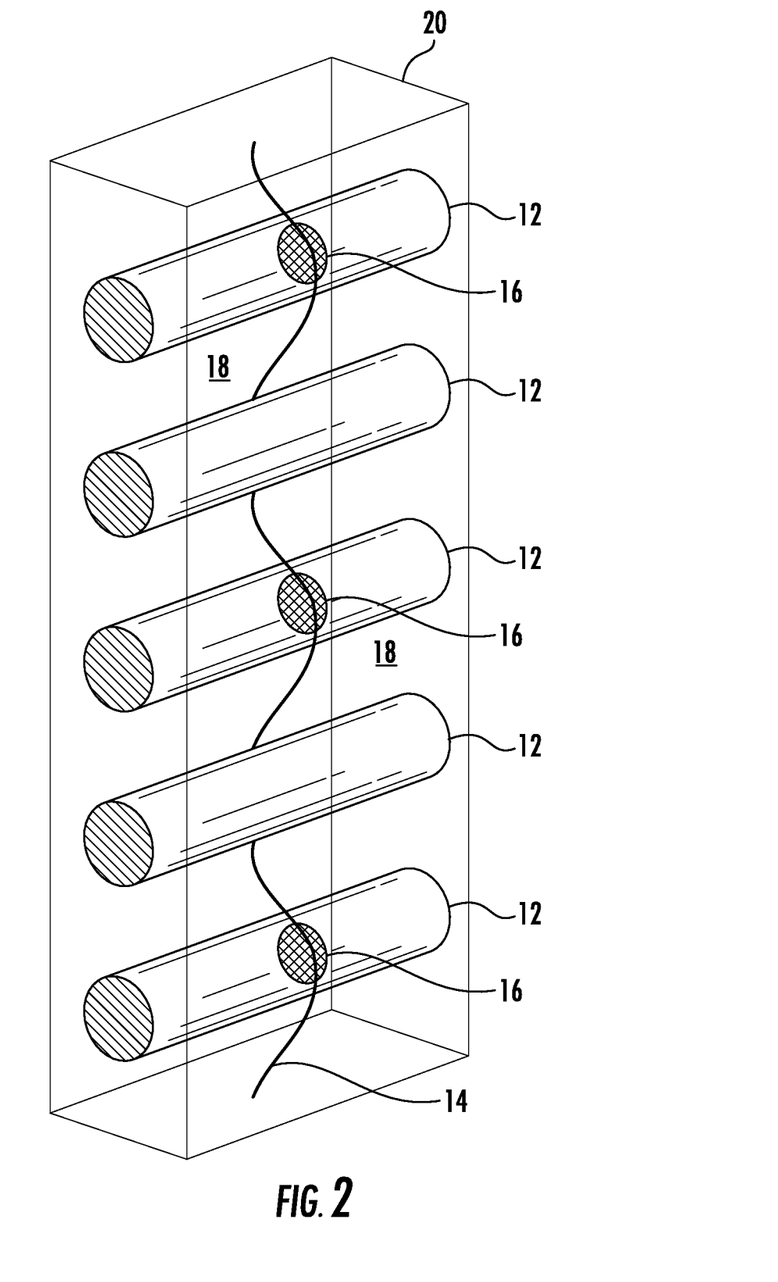
FIG. 2 is a schematic illustration showing a control volume of the nanocomposite of FIG. 1.

A nanocomposite 10 consistent with the present disclosure further includes a plurality of nanofibers 14 which are disposed in inserted stitched relation through the array of extended length fibers 12. In this regard, the term "stitched relation" refers to the undulating path of the nanofibers through different planes occupied by the extended length fibers 12 as best seen in FIG. 2. As shown, the nanofibers 14 may be oriented with their length dimensions transverse (and preferably substantially perpendicular) to the length dimensions of the extended length fibers 12. In accordance with a potentially preferred practice, in a nanocomposite 10 consistent with the present disclosure, the nanofibers 14 will on average overlap not fewer than three (and preferably at least 5) extended length fibers 12 so as to establish a long range nano-stitching pattern. In this regard, it will be understood that while some of the nanofibers 14 may overlap fewer than three extended length fibers 12, other nanofibers 14 will overlap larger numbers of extended length fibers 12 thereby establishing an average of greater than three overlaps. In general, a larger number of overlaps may be desirable so as to establish a larger number of contact points between the nanofibers 14 and the extended length fibers 12 to enhance load transfer as will be described further hereinafter.

A nanocomposite 10 consistent with the present disclosure further includes a connecting agent 16 to secure the nanofibers 14 to the extended length fibers 12 at contact locations where the nanofibers 14 overlap the extended length fibers 12. As shown, the connecting agent 16 may be substantially localized at the contact locations. By substantially localizing the connecting agent 16, the interstitial zones between the fiber components have substantial portions which may be free of connecting agent and the nanocomposite 10 is provided with a substantially porous internal void volume 18 devoid of connecting agent. As will be appreciated, such a structure differs significantly from prior fiber reinforced plastics and other composites, wherein the connecting agent typically substantially saturates and fills all interstitial zones.

In accordance with one exemplary practice, a nanocomposite 10 consistent with the present disclosure may contain a level of connecting agent 16 which is sufficient to: (i) secure the extended length fibers 12 to the nanofibers 14 at contact locations; and (ii) create within the nanocomposite 10, a high porosity internal void volume 18 characterized in a manner such that the space in a representative control volume 20 (FIG. 2), excluding the extended length fibers 12 and the nanofibers 14, is at least 20%, (and more preferably at least 50%) not occupied by connecting agent 16. That is, the porosity of the nanocomposite 10 may be defined by the following formula:

$$\frac{V - V_f - V_{nf} - V_{ca}}{V - V_f - V_{nf}} \geq 20\%$$

where V equals total control volume; $V_f$ equals volume of extended length fibers 12; $V_{nf}$ equals volume of nanofibers; and $V_{ca}$ equals volume of connecting agent.

The resultant nanocomposite 10 possesses a nano-scale long-range mechanical interlock between the array of extended length fibers 12 and the nanofibers 14. A feature of the resultant nanocomposite 10 is the ability to transfer load between at least two non-adjacent extended length fibers 12 within the array of extended length fibers through a common nanofiber 14 with the connecting agent 16 used to form or promote mechanical interlock between the extended length fibers 12 and nanofiber 14.

In one significant aspect of the nanocomposite 10, significant internal porosity is established which is not filled with connecting agent 16. However, due to the nano-scale long-range mechanical interlock provided by the nanofibers 14, there is no need for full matrix saturation as is typically required in traditional matrix bonded composites.

The connecting agent 16 may take a number of different forms. By way of example only, and not limitation, in accordance with the illustrated exemplary practice, the connecting agent may be a bonding material independent from the extended length fibers 12 and nanofibers 14. One category of such bonding materials are resins such as thermoset or thermoplastic resins and the like. However, it is also contemplated that the connecting agent 16 may be a bonding force established at the interfaces between the extended length fibers 12 and nanofibers 14 and which is not reliant on using a material separate from the fibrous constituents. By way of example, such a bonding force connecting agent may be in a form such as a friction force, VanderWaals force, a direct fusion weld between the extended length fibers 12 and nanofibers 14, a chemical reaction product formed by the extended length fibers 12 and nanofibers 14, a magnetic force between the extended length fibers 12 and nanofibers 14, electric charge-based forces between the extended length fibers 12 and nanofibers 14, and the like. Of course, other connecting agents may likewise be used if desired.

In one exemplary practice, a direct fusion weld between the extended length fibers 12 and nanofibers 14 may be established when the extended length fibers 12 and/or nanofibers 14 are partially melted and allowed to resolidify thereby bonding to adjacent fiber structures at points of contact. Techniques for such localized melting and bonding may include sonic welding and the like. In another exemplary practice, the extended length fibers 12 and/or nanofibers 14 may be selected to chemically react with one another so as to form a reaction product which bonds the fibers at points of connection. In another exemplary practice, the extended length fibers 12 and nanofibers 14 may be bonded by a magnetic force if the fiber constituents contain magnetizable materials. In yet another exemplary practice, electric charges may be applied and/or static charges may be established through friction and the like to act as the connecting agent 16 and thereby bond the extended length fibers 12 and nanofibers 14 together.

By way of example only, and not limitation, a nanocomposite 10 consistent with the present disclosure may be formed by a process having three major steps. In a first step, a carrier fluid may be used to transport a plurality of the nanofibers 14 into a preformed fibrous array of the extended length fibers 12. In this step, the nanofibers 14 may be introduced in the desired aligned "Z" direction orientation relative to the extended length fibers 12 by techniques as illustrated and described in international application PCT/US2014/048406 entitled Method For Manufacturing Nano-Structurally Aligned Multi-Scale Composites, the teachings of which are hereby incorporated by reference as if set forth herein in their entirety. However, any other exemplary technique may likewise be used. In a subsequent second step, a significant portion of the carrier fluid is removed such that at least about 20% of the volume fraction of such carrier fluid introduced into the fibrous array is removed thereby creating a substantial internal void volume. In a third step, which can be initiated at any time, the connecting agent 16 is activated thereby mechanically adjoining the nanofibers 14 with the extended length fibers 12.

If desired, the internal void volume 18 may be at least be partially filled with a resin, metallic, magnetic, ceramic, conductive, semi-conductor, phase change, or shape-memory material (e.g., alloy or polymer). Further, the internal void volume 18 may be at least partially filled with an energy absorption material, energy absorption gel, inorganic energy absorption material (such as ceramic), and organic energy absorption material.

A nanocomposite 10 consistent with the present disclosure may characterized by significant mechanical strength in spite of the substantial internal void volume. In particular, the nanocomposite 10 may have a tensile strength in the direction parallel to the majority of extended length fibers 12 which is not less than 60% of the tensile strength of a corresponding benchmark composite consisting of an equivalent amount of extended length fiber fully saturated with the same connecting agent.

Figure 3:
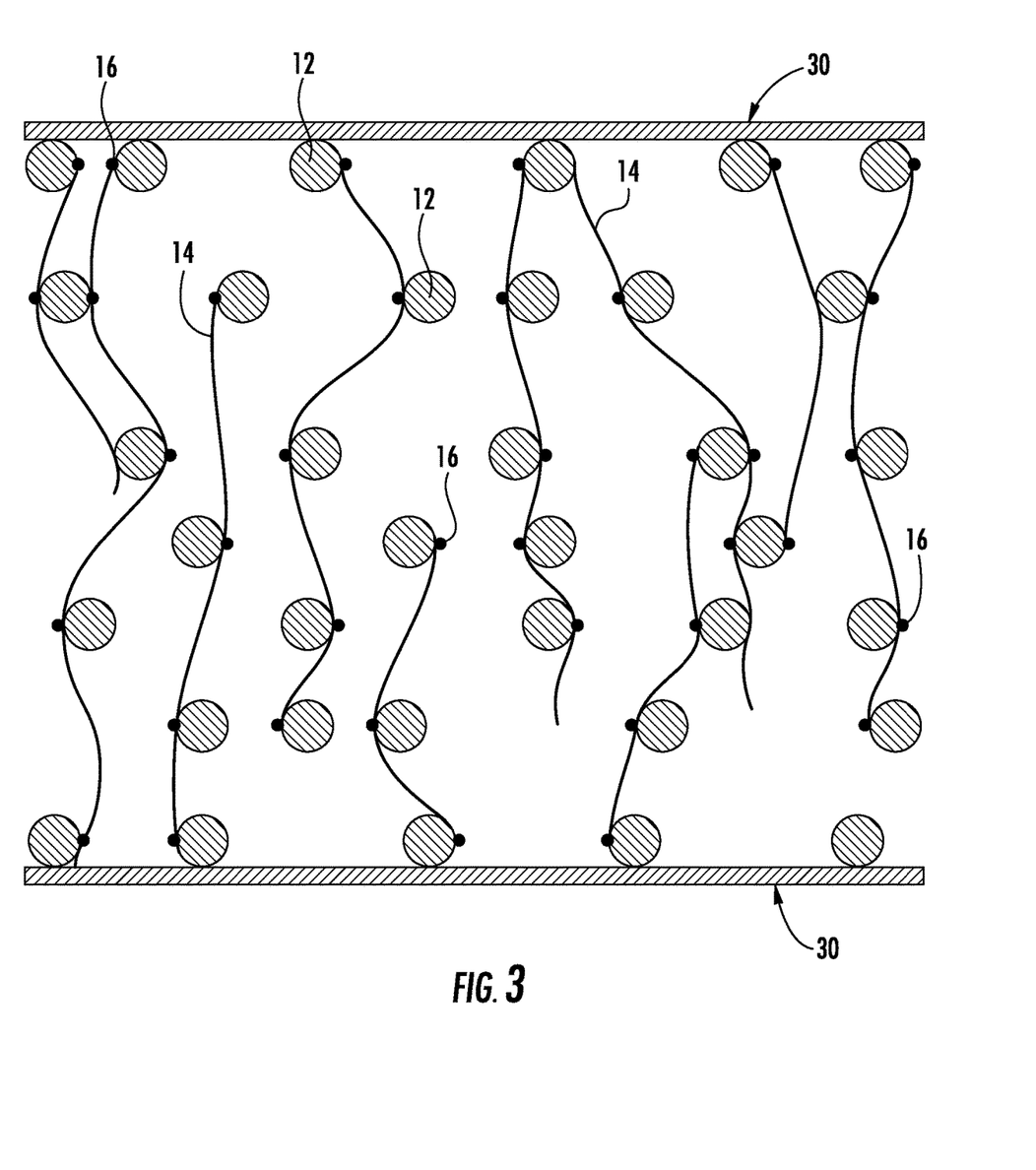
FIG. 3 is a schematic view taken generally along line 3-3 in FIG. 1, illustrating the presence of an optional topical coating at surfaces of the nanocomposite.

If desired, at least one protective coating or film 30 (FIG. 3) may be added to the surface of a nanocomposite 10 consistent with the present disclosure to protect against a harsh environment. By way of example only, exemplary examples of such a protective coating or film 30 may include thermoplastic polymers, thermoset polymers, silicon, corrosion-resistant metal deposition, ceramics, breathable waterproof membrane (e.g., a highly stretched, porous PTFE membrane), breathable water-proof fabrics, other nanocomposite 10, and porous materials formed by any abovementioned ingredients, etc.

If desired, at least one water-proof and breathable coating or film may be added to the surface of a nanocomposite 10 consistent with the present disclosure to protect against water damage. Exemplary examples of such coating or film may include thermoplastic polymers, thermoset polymers, silicon, corrosion-resistant metal deposition, ceramics, breathable water-proof membranes, breathable water-proof fabrics, other nanocomposite 10, and porous materials formed by any of abovementioned ingredients, etc.

If desired, a thin depth of a nanocomposite 10 consistent with the present disclosure may be sealed with a coating layer to protect against a harsh environment. Exemplary examples of such coating layer include, but are not limited to, thermoplastic polymers, thermoset polymers, silicon, corrosion-resistant metal deposition, ceramics, breathable water-proof membrane, breathable water-proof fabrics, and other nanocomposite 10, etc.

If desired, a thin depth of a nanocomposite 10 consistent with the present disclosure may be sealed with a water-proof and breathable coating to protect against water damage. Exemplary examples of such coating include, but not limited to, thermoplastic polymers, thermoset polymers, silicon, breathable water-proof membrane, breathable water-proof fabrics, nanocomposite 10, and porous materials formed by any of abovementioned ingredients, etc.

Further, with respect to the nanocomposite 10 composition, the extended length fibers 12, connecting agent 16, and internal void volume 18 can at least partially consist of a functional material (hereinafter referred to as "functionalized" core components). Functional materials exemplary for the "functionalized" core components include, but are not limited to, sensor materials, actuator materials, absorption materials, damping materials, repair materials, self-healing materials, light-emitting materials, optical materials, conductors, semi-conductors, insulators, medicines, bio-medical materials, fire-retarding materials, fire extinguishing materials, reactive materials, catalyst materials, or mixtures thereof. Further, the functional materials can be materials that can be controlled by means including, but not limited to, temperature, light, electrical field, magnetic field, pH, humidity, chemical content in contact therewith. Further the functional materials can have useful property changes including, but not limited to, electronic, magnetic, optical, mechanical, piezoelectric, ferroelectric, photovoltaic, chromogenic, shape memory, thermoelectric, self-healing, self-assembling, phase change, exothermic reaction, endothermic reaction, chemical properties, weld materials, adhesives, and bio-medical. Further, the functional materials can be liquid, gas phase, or solid phase. Further, the functional material can be a phase change material.

With respect to methods of use for the "functionalized" core components, exemplary uses include absorption of waves, absorption of signals, emission of waves, and emission of signals. With respect to absorption of waves, these waves can be mechanical (acoustic, mass, chemical concentration, light (light and beams) or electromagnetic (of light, radio frequency, microwave, x-ray, and cosmic ray). With respect to absorption of signals, the signals can be mechanical or electromagnetic., e.g., acoustics, sound, electrical, magnetic, radiation, mass, light, temperature, and chemical. With respect to methods of use for the "functionalized" core components, further exemplary uses include controlling the response to absorption of waves and absorption of signals.

Methods of use of the "functionalized" core components may further include (with respect to nanocomposite 10) sensing, repairing, or self-healing any damage, more specifically retarding any fire damage or extinguishing fire therein or near thereto. Additional methods of use of the "functionalized" core components may include (with respect to nanocomposite 10) detecting or/and removing dangerous chemicals by contact therewith, weld-joining at least two pieces thereof, dissembling at least two pieces thereof, magnetic-joining at least two pieces thereof, adhesive-joining at least two pieces thereof, promoting the electrical connection between at least two joined pieces, and promoting the aforethe physical properties thereof. Exemplary physical properties include, but are not limited to, electrical, magnetic, thermal, acoustic, thermo-mechanical, and optical. Exemplary electrical properties include, but are not limited to, conductivity, dielectric constant, impedance, and dielectric strength. Exemplary thermal properties include, but are not limited to, thermal conductivity, specific heat, latent heat and melting temperature. Exemplary thermal-mechanical properties include, but are not limited to, storage modulus and loss modulus (at different temperature and the time the nanocomposite 10 can endure at a high temperature).

Additional methods of use of the "functionalized" core components include (with respect to nanocomposite 10) promoting the performance thereof. Exemplary measures of performance include, but are not limited to, lightning strike, radiation shielding, cosmic ray shielding, thermal protection barrier, electromagnetic interference shielding and radio frequency interference shielding.

With respect to methods of use not relating to "functionalized" core components, the aforementioned internal void volume 18 can be used for acoustic absorption or signal absorption. Further, the aforementioned internal void volume 18 can used to control the direction of fluid flow into or out of the nanocomposite 10. Exemplary variations of such control include methods wherein the internal void volume 18 changes: (i) the streamline of a fluid flow along the surface of the nanocomposite 10; (ii) the pressure distribution of a fluid flow along the surface of the nanocomposite 10; (iii) the flow boundary layer of a fluid flow along the surface of the nanocomposite 10; an (iv) the thermal boundary layer of a fluid flow along the surface of the nanocomposite 10. Further exemplary variations of such control include methods wherein the internal void volume 18 is additionally used to control: (i) the boundary layer of a body at least partially covered by the nanocomposite 10 when relatively moving against an external fluid environment; (ii) the drag on a body at least partially covered by the nanocomposite 10 when relatively moving against an external fluid environment; (iii) the lift force on a body at least partially covered by the nanocomposite 10 when relatively moving against an external fluid environment; and (iv) the fluid dynamics on a body at least partially covered by the nanocomposite 10 when relatively moving against a fluid environment.

Further exemplary variations of such control include methods wherein the internal void volume 18 is additionally used to: (i) cool or heat the nanocomposite 10 or the environment containing the nanocomposite 10; (ii) de-ice the surface of the nanocomposite 10 or the environment containing the nanocomposite 10; (iii) draw a stream away from the nanocomposite 10; and (iv) draw a stream into the nanocomposite 10; and (iv) draw an effluent away from the nanocomposite 10.

Further with respect to methods of use not relating to "functionalized" core components, the aforementioned internal void volume 18 can be coated or filled or partially filled with at least one functional material. Such functional material can be used to: (i) promote bone or tissue growth; (ii) repel water while simultaneously allowing air to pass through; (iii) repel a type of chemical fluid while simultaneously allowing other type of fluids to pass through; (iv) promote bio-growth; (v) prevents bio-growth; (vi) transmit of electricity; (vii) perform as a substrate for a catalyst and (viii) detect a predetermined chemical.

Further with respect to methods of use not relating to "functionalized" core components, the nanocomposite 10 can provide a first function comprising mechanical strength to bear load and the internal void volume 18 can provide a second function. Such second function can include, but is not limited to damage sensing, self-healing, easy repair, fluid dynamics control/sensing, thermal control/sensing, control and sensing of chemicals in contact therewith, humidity control/sensing, de-icing, weld-joining, weld-dissembling, adhesive joining, magnetic joining, promoted electrical properties, promoted thermal properties, promoted magnetic properties, promoted optical properties, promoted acoustic properties, promoted thermal-mechanical properties, enhanced the electrical connection between two connected pieces of the nanocomposite 10, promoted biomedical performance of the nanocomposite 10, waves or signals absorption, wave or signals emit, impact energy absorption, vibration damping, shielding against lightning strike, EMI, RFI, radiation, or cosmic ray, or create a thermal protection barrier.

Further with respect to methods of use not relating to "functionalized" core components, the nanocomposite 10 can have a higher specific tensile modulus (ratio of tensile modulus to the specific weight) than a corresponding benchmark composite.

Further with respect to methods of use not related to "functionalized" core components, the nanocomposite 10 can have a higher specific tensile strength (i.e., ratio of tensile strength to the specific weight) than a corresponding benchmark composite.

Further with respect to methods of use not related to "functionalized" core components, the nanocomposite 10 can have a higher specific compressive modulus (i.e., ratio of compressive modulus to the specific weight) than a corresponding benchmark composite.

Further with respect to methods of use not related to "functionalized" core components, the nanocomposite 10 has higher specific compressive strength (i.e., ratio of compressive strength to the specific weight) than a corresponding benchmark composite.

Further with respect to methods of use not related to "functionalized" core components, the nanocomposite 10 can have a higher strength against delamination than a corresponding benchmark composite.

Aspects of the present disclosure may be further understood through reference to the following non-limiting examples.

Example 1

Nanofibers such as long carbon filaments having a length of about 50-500 micrometers and diameters of about 50-150 nanometers are dispersed in a carrier fluid containing B-stage thermoset resin (such as water borne-epoxy which is half-cured so the carrier fluid is solid phase a room temperature) and its compatible solvent (water in the case of the water borne-epoxy). In this procedure the resin is dissolvable in the compatible solvent and will come out of solution when the solvent is removed. The carrier fluid can be heated and become liquid and can also be cooled to become solid. The nanofibers are aligned with the carrier fluid in the liquid phase using a strong electric or magnetic field followed by solidification and subsequent aligned transfer into a preformed array of extended length fibers 12 by techniques as set forth in PCT/US2014/048406 entitled Method For Manufacturing Nano-Structurally Aligned Multi-Scale Composites. By aligning the nanofibers with the fluid in liquid phase and solidifying the fluid after alignment, a film containing the aligned nanofibers and the fluid is formed. If desired a highly porous sponge can be used to absorb and retain the nanofibers and fluid.

The solidified film may be pressed against a pre-heated array of extended length carbon fibers in the form of a fabric or the like. The solidified fluid that is in direct contact with the heated fibers may be melted so the aligned nanofibers are gradually transferred along with melted fluid into the preformed fiber array. The long nanofibers thereby form a long-range stitching pattern within the preformed fiber array. Following introduction of the nanofibers 14 and fluid into the preformed array of extended length fibers, a vacuum with appropriately elevated temperature may be applied to vaporize the solvent (e.g., water) so the B-stage resin remaining inside the fiber array becomes solid and bonds the nanofibers to the extended length fibers. The significant internal void volume 18 is formed and precisely controlled by the vaporization of solvent. Thus by completely removing the solvent one will create a significant void space. Due to surface tension, the resin accumulates preferentially at the interfaces between the nanofibers and the extended length fibers thereby forming localized bonding.

Of course, variations and modifications of the foregoing are within the scope of the present disclosure. Thus, it is to be understood that the disclosure disclosed and defined herein extends to all alternative combinations of two or more of the individual features mentioned or evident from the text and/or drawings. All of these different combinations constitute various alternative aspects of the present disclosure.

What is claimed is:

1. A nanocomposite comprising:
an array of extended length fibers, the extended length fibers having a cross-sectional diameter and a length dimension, wherein the length dimension is at least 100 times greater than the cross sectional diameter and wherein at least a portion of the extended length fibers are arranged with their length dimensions extending substantially parallel to a common reference plane;
a plurality of nanofibers extending in stitched relation at least partially across the array of extended length fibers, wherein the nanofibers are oriented with their length dimensions transverse to the common reference plane, and wherein on average, the nanofibers contact and operatively connect three or more of the extended length fibers such that the nanofibers form a long-range nano-stitching pattern and wherein said nanofibers are disposed in an aligned "Z" direction orientation longitudinally within the array transverse to the common reference plane such that said nanofibers extend from a first elevation within the array to a second elevation within the array below the first elevation; and
a connecting agent operating at points of connection between the nanofibers and the extended length fibers such that the connecting agent interlocks the nanofibers to the extended length fibers at the points of connection such that the nanofibers are held in supported relation substantially only in the aligned "Z" direction orientation within said array; and
zones remote from the points of connection which are substantially devoid of the connecting agent, wherein the nanocomposite has a porous internal void volume and wherein a control volume of the nanocomposite comprising at least three extended length fibers and at least one nanofiber satisfies the following formula:

$$\frac{V - V_f - V_{nf} - V_{ca}}{V - V_f - V_{nf}} \geq 20\%$$

wherein V equals total control volume; $V_f$ equals volume of extended length fibers within the control volume; $V_{nf}$ equals the volume of nanofibers within the control volume; and $V_{ca}$ equals volume of connecting agent within the control volume.

2. The nanocomposite as recited in claim 1, wherein the connecting agent is a resin adapted for dissolution in a compatible solvent.

3. The nanocomposite as recited in claim 2, wherein the connecting agent is a thermoset epoxy dissolvable in water.

4. The nanocomposite as recited in claim 2, wherein the connecting agent comprises a resin selected from the group consisting of thermoplastic polymers, thermoset polymers and mixtures thereof.

5. The nanocomposite as recited in claim 1, wherein the connecting agent is a selected from the group consisting of viscous material, elastic material and visco-elastic material.

6. The nanocomposite as recited in claim 1, wherein on average, the nanofibers are interlocked with four or more extended length fibers.

7. The nanocomposite as recited in claim 1, wherein on average, the nanofibers are interlocked with five or more extended length fibers.

8. The nanocomposite as recited in claim 1, wherein the porous internal void volume is at least partially filled with a material selected from the group consisting of an aerogel material, a resin material, a metallic material, a magnetic material, a ceramic material, a conductive material, a semiconductor material, a phase change material, and a shape-memory material.

9. The nanocomposite as recited in claim 1, wherein the extended length fibers, and/or the nanofibers and/or the connecting agent comprises a functional material selected from the group consisting of sensor materials, actuator materials, absorption materials, damping materials, repair materials, self-healing materials, light-emitting materials, optical materials, conductors, semi-conductors, insulators, medicines, bio-medical materials, fire-retarding materials, fire extinguishing materials, reactive materials, catalyst materials, shape-memory materials, hydrophobic materials, hydrophilic materials and mixtures thereof.

10. The nanocomposite as recited in claim 1, wherein the porous internal void volume is at least partially filled with a functional material selected from the group consisting of sensor materials, actuator materials, absorption materials, damping materials, repair materials, self-healing materials, light-emitting materials, optical materials, conductors, semi-conductors, insulators, medicines, bio-medical materials, fire-retarding materials, fire extinguishing materials, reactive materials, catalyst materials, shape-memory materials, hydrophobic materials, hydrophilic materials and mixtures thereof.

11. The nanocomposite as recited in claim 1, wherein the nanocomposite repels water while simultaneously allowing air to pass through the nanocomposite.

12. The nanocomposite as recited in claim 1, wherein the porous internal void volume is at least partially filled with an energy absorption material selected from the group consisting of an energy absorption gel, a ceramic, and an organic energy absorption material.

13. The nanocomposite as recited in claim 1, wherein the porous internal void volume provides at least one defined functionality selected from the group consisting of: acoustic absorption; wave absorption; allowing fluid flow direction through the internal void volume and combinations of any of the foregoing.

14. The nanocomposite as recited in claim 13, wherein the porous internal void volume is adapted to provide at least one defined functionality selected from the group consisting of: cooling or heating the nanocomposite; cooling or heating an environment containing the nanocomposite; de-icing a surface of the nanocomposite or the environment containing the nanocomposite; drawing a stream away from the nanocomposite; drawing a stream into the nanocomposite; drawing an effluent away from the nanocomposite and combinations of any of the foregoing.

15. The nanocomposite as recited in claim 1, wherein the porous internal void volume is coated or filled or partially filled with at least one functional material and is adapted to provide at least one defined functionality selected from the group consisting of: promoting bone or tissue growth; repelling water while simultaneously allowing air to pass through; repelling a type of chemical fluid while simultaneously allowing other type of fluids to pass through; promoting bio-growth; preventing bio-growth; transmitting of electricity; acting as a substrate for a catalyst; detecting a predetermined chemical and combinations of any of the foregoing.

16. The nanocomposite as recited in claim 1, wherein the nanocomposite is characterized by mechanical tensile strength in a direction parallel to a majority of extended length fibers which is not less than 60% of the tensile strength of a corresponding benchmark composite consisting of an equivalent amount of extended length fiber fully saturated with the same connecting agent.

17. The nanocomposite as recited in claim 1, wherein the extended length fibers are disposed in multiple planes.

18. The nanocomposite as recited in claim 1, wherein the extended length fibers are carbon fibers.

19. A nanocomposite comprising:
an array of extended length fibers, the extended length fibers having a cross-sectional diameter and a length dimension, wherein the length dimension is at least 100 times greater than the cross sectional diameter and wherein at least a portion of the extended length fibers are arranged with their length dimensions extending substantially parallel to a common reference plane;
a plurality of nanofibers extending in stitched relation at least partially across the array of extended length fibers, wherein the nanofibers are oriented with their length dimensions transverse to the common reference plane, and wherein the nanofibers on average, contact and operatively connect three or more of the extended length fibers such that the nanofibers form a long-range nano-stitching pattern and wherein said nanofibers are disposed in an aligned "Z" direction orientation longitudinally within the array transverse to the common reference plane such that said nanofibers extend from a first elevation within the array to a second elevation within the array below the first elevation; and
a connecting agent operating at points of connection between the nanofibers and the extended length fibers such that the connecting agent interlocks the nanofibers to the extended length fibers at the points of connection such that the nanofibers are held in supported relation substantially only in the aligned "Z" direction orientation within said array;
a surface coating or film and
zones remote from the points of connection which are substantially devoid of the connecting agent, wherein the nanocomposite has a porous internal void volume and wherein a control volume of the nanocomposite comprising at least three extended length fibers and at least one nanofiber satisfies the following formula:

$$\frac{V - V_f - V_{nf} - V_{ca}}{V - V_f - V_{nf}} \geq 20\%$$

wherein V equals total control volume; $V_f$ equals volume of extended length fibers within the control volume; $V_{nf}$ equals the volume of nanofibers within the control volume; and $V_{ca}$ equals volume of connecting agent within the control volume.

20. The nanocomposite as recited in claim 19, wherein the surface coating or film is waterproof and breathable adapted to protect against water damage.

21. The nanocomposite as recited in claim 19, wherein the surface coating or film is selected from the group consisting of polymers, metals, ceramics, nanocomposites, and porous materials with small pore size all adapted to seal from a harsh environment.

* * * * *